Patented Feb. 18, 1930

1,747,638

UNITED STATES PATENT OFFICE

JOHN W. MARKLEY, OF WASHINGTON, AND GEORGE F. ELLIOTT, OF WAYNESBURG, PENNSYLVANIA; SAID ELLIOTT ASSIGNOR TO SAID MARKLEY

BOILER COMPOUND

No Drawing. Application filed April 15, 1929. Serial No. 355,416.

This invention relates to a composition designed primarily for the removal of incrustations, such as scale and the like, from hot water systems, including steam boilers, automobile radiators, water jackets of internal combustion engines, and like systems.

The composition, in the several ingredients hereinafter enumerated, has the effect of attacking and loosening the scale or incrustation and thereafter, or simultaneously, dissolving such scale or incrustation, so that following the use of the composition, the internal surface which has been treated is wholly free of any such scale or incrustation and clean and wholly smooth so far as any projections incident to incrustation or scale are concerned.

The improvement provides for the use of crude petroleum, potato juice, oak bark, walnut bark, boneset, wild cherry bark, and potash. These ingredients, more or less mixed, are placed in a tank and subjected to a boiling action until thoroughly dissolved and disintegrated, this course ordinarily consuming a period of about ten hours. The mixture is then removed from the tank and strained to separate particles held in suspension, and the resultant liquid is ready for use.

The proportions of the various ingredients are more or less important and it has been found that the following proportions produce an admirable composition which effectively serves the purpose; that is to say, for the production of two hundred gallons of the composition, there is to be used one quart of crude petroleum, ten pounds of potatoes, ten pounds of oak bark, ten pounds of walnut bark, five pounds of boneset, ten pounds of wild cherry bark, and ten pounds of potash, sufficient water being added to complete the quantity.

Experiment has shown that the combination of the oil, potatoes, oak bark and potash tend to loosen the scale or incrustation but not to otherwise affect it, and that by the inclusion in the composition of the wild cherry bark, boneset and walnut bark, the loosened scale or incrustation is dissolved, so that it can be readily drawn off in solution by merely draining the boiler or other system.

In the use of the composition, for example in steam boilers, it has been found that if the boiler shows a heavy incrustation or scale formation, that for each estimated horsepower output of the boiler, one quart of the composition is used in the water each day for a period of thirty days, the boiler being drained or blown off once every four or five days. At the end of this period, it will be found that the scale and incrustation has been thoroughly and effectively removed from the boiler, first by loosening such incrustation and then by dissolving it, so that it can be carried off in solution with the water.

The solution, while effective for removing incrustation or scale from hot water systems, is equally as effective for preventing the formation of such incrustation or scale. For example, after a boiler or system has been once cleaned, or if a new boiler or system is being operated, the addition of one pint each day to the water employed in the system will be found effective to prevent the formation of scale or other incrustation.

While experience has demonstrated that the above proportions are best suited for an effective operation of the composition, it is to be understood that the invention contemplates any reasonable variation in these proportions which may be found necessary in connection with the particular type of system, particular character of the water employed, or the condition of the system when the treatment is started.

What is claimed to be new is:

1. A composition for removing scale and like incrustation, including crude petroleum, potatoes, oak bark, walnut bark, boneset, wild cherry bark and potash.

2. A composition for removing scale and like incrustation, including crude petroleum, potatoes, oak bark, walnut bark, boneset, wild cherry bark and potash, the said ingredients being dissolved together by boiling and subjected to straining.

3. A composition for removing scale and like incrustation, including the following ingredients in the proportions named: crude petroleum, one quart; potatoes, ten pounds; oak bark, ten pounds; walnut bark, ten pounds; boneset, five pounds; wild cherry bark, ten pounds; and potash, ten pounds.

4. A composition for removing scale and like incrustation, including the following ingredients in the proportions named: crude petroleum, one quart; potatoes, ten pounds; oak bark, ten pounds; walnut bark, ten pounds; boneset, five pounds; wild cherry bark, ten pounds; and potash, ten pounds, the said ingredients being associated in solution with a liquid vehicle.

In testimony whereof we affix our signatures.

JOHN W. MARKLEY. [L. S.]
GEORGE F. ELLIOTT. [L. S.]